United States Patent [19]

Peck

[11] 4,344,508

[45] Aug. 17, 1982

[54] LIFT MECHANISM FOR A VEHICLE TAIL-BOARD OR OTHER LOAD PLATFORM

[75] Inventor: Albert W. Peck, Goldington, England

[73] Assignee: Alcan Research and Development Limited, Montreal, Canada

[21] Appl. No.: 173,337

[22] Filed: Jul. 29, 1980

[30] Foreign Application Priority Data

Aug. 3, 1979 [GB] United Kingdom ................. 7927159

[51] Int. Cl.³ .............................................. B66B 9/20
[52] U.S. Cl. .................................... 187/9 R; 414/546; 414/917
[58] Field of Search .............. 187/9 R, 8.71; 414/545, 414/546, 549, 540, 541, 917, 921; 280/166; 296/55, 56, 50

[56] References Cited

U.S. PATENT DOCUMENTS 3,737,062  6/1973  Schnell ................................. 414/917
4,078,676  3/1978  Mortenson ........................... 414/917

Primary Examiner—Robert J. Spar
Assistant Examiner—Kenneth Noland

Attorney, Agent, or Firm—Cooper, Dunham, Clark, Griffin & Moran

[57] ABSTRACT

A lifting mechanism for a vehicle tail-board or other platform comprises at least one set of two main levers 12, 13 each of which essentially provides three non-colinear pivots defining a triangle, and the two triangles are substantially identical. Corresponding pairs of pivots 12a and 13a, and 12b and 13b, are respectively interconnected by a tilting lever 14 and a link 16, and corresponding pivots 12c and 13c are interconnected by being connected to spaced fixed locations on the tail-board 10. A hydraulic jack 23 is connected between a pin 26 on lever 12 and a fixed bracket 18, which also carries pivot 12a, and operates to move the tail-board in a horizontal attitude between the ground and the vehicle floor level, and a second jack 22 is connected between bracket 18 and a crank arm 21 of lever 14 and operates, when the platform is at vehicle floor level, to move lever 13 bodily in an arcuate path about pivots 12a, and 12b and 12c to swing the tail-board into a vertical attitude. A ramp 35 pivotally attached to the tail-board is movable into positions aligned with and at right angles to the tail-board to facilitate loading, to prevent a load from slipping or rolling off, and to form an upright extension of the tail-board.

9 Claims, 2 Drawing Figures

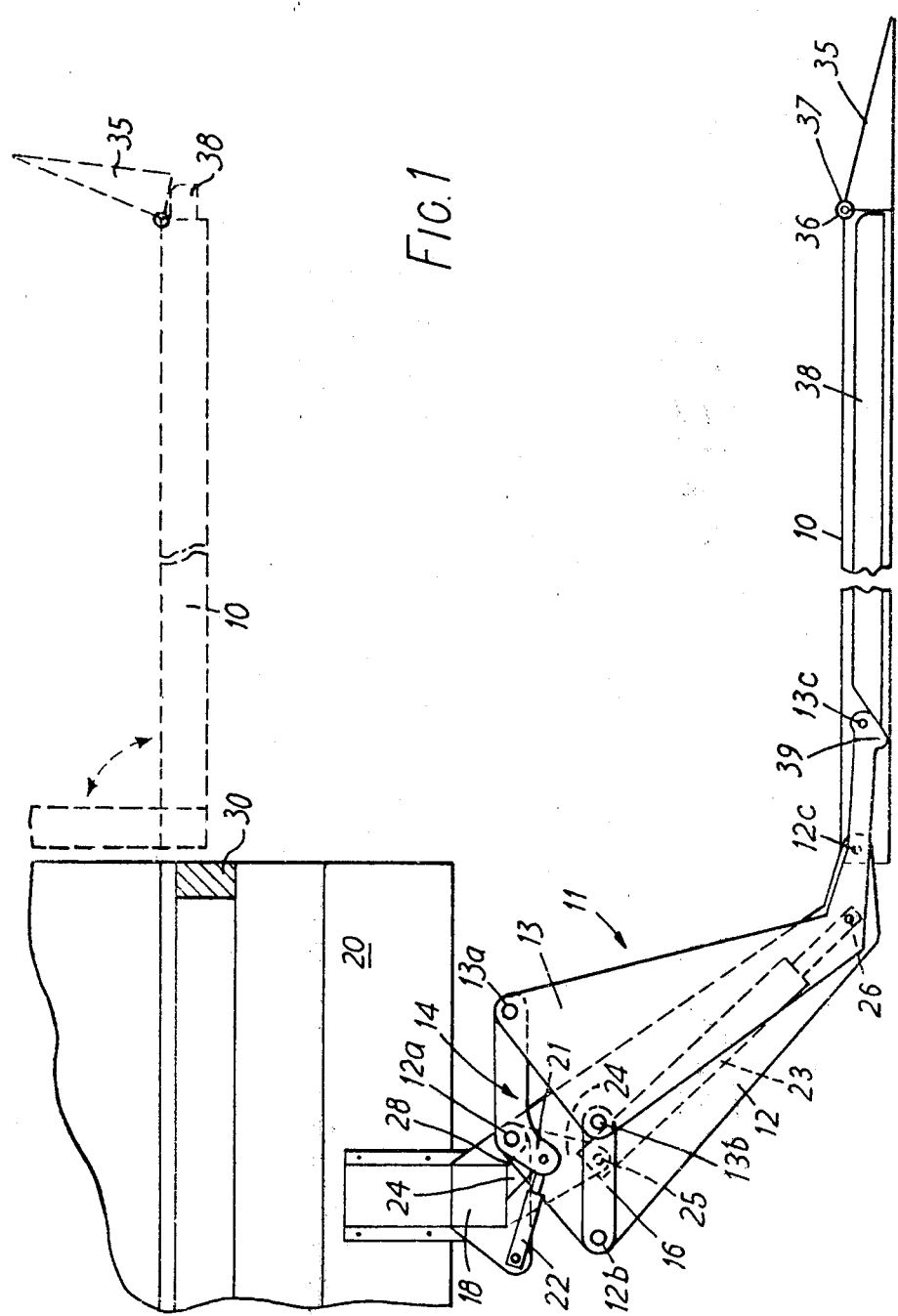

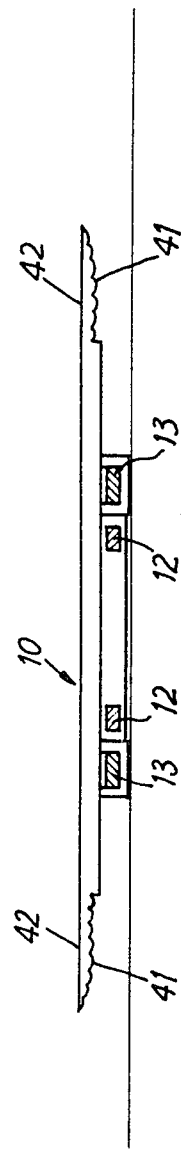

LIFT MECHANISM FOR A VEHICLE TAIL-BOARD OR OTHER LOAD PLATFORM

This invention relates to a swivelling lift mechanism for raising and lowering a load platform and has a particularly useful but not exclusive application in a mechanism for moving a vehicle tail-board from its initial vertical position at the rear of the vehicle body into a horizontal position and then in substantially the same horizontal attitude to ground level and back again, whereby the tail-board can be used to carry loads between the floor of the vehicle and a lower level.

According to this invention there is provided a lift mechanism for a load-carrying platform comprising at least one parallelogram linkage constituted by two main levers each having three non-colinear pivots and the pivots on the two levers defining substantially identical triangles, and the levers being horizontally offset from each other in a direction towards and away from the platform, one pair of corresponding pivots on the two levers being respectively connected to the platform at two fixed points which are spaced apart a predetermined distance in the direction of the length of the platform, the pivots constituting the second pair being spaced apart by said predetermined distance and interconnected by a synchronising link, and the pivots constituting the third pair being spaced apart by said predetermined distance and interconnected by a tilting lever, one of the pivots of the third pair having a fixed mounting on the vehicle, means for rotating the main levers about their respective pivots constituting the third pair, and means for selectively moving the tilting lever about the fixed pivot point into a first position in which the pivots constituting the third pair are disposed one vertically above the other into a second position in which the said pivots constituting the third pair are substantially in horizontal alignment.

According to a preferred feature of the invention at least the main lever nearest the platform is cranked and/or cut away in the region of said first pivot thereof in such a manner that the parts of the lever which overlap the platform do no protrude above the load-carrying surface of the platform in any position of the platform within its range of movement.

According to another preferred feature of the invention the pivot having the fixed mounting is the pivot of the third pair furthest from the platform when the latter is in a horizontal attitude.

In a preferred construction according to the invention a stop operative to support the tilting lever in a first position in which the pivot constituting the third pair are horizontally aligned with each other. Preferably the first said stop is removable and a second stop is provided which operates, on removal of the first stop, to permit the platform to rotate the tilt lever about said fixed pivot beyond the first said position towards a second position which is determined by the second stop, and in which the platform is inclined downwardly from its edge nearer said fixed mounting.

According to yet another preferred feature of the invention the main levers are connected to the platform adjacent the widthwise edge of the platform, and the platform has pivotally connected to its opposite widthwise edge a ramp member, and a rod is connected between the ramp member and the linkage in such a manner that movement of the linkage to raise the platform moves the rod in a sense to swivel the ramp upward about its pivot connection to the platform.

The invention will now be described in more detail with reference to the accompanying diagrammatic drawings in which:

FIG. 1 shows a side elevation of a lift mechanism according to the present invention as applied to a vehicle tail-board, and FIG. 2 illustrates a preferred feature of the tail-board shown in FIG. 1.

Referring to FIG. 1 of the drawings, the tail-board 10 is supported by two identical parallelogram linkages 11 which are spaced apart widthwise of the tail-board (i.e. transversely of the vehicle). These linkages are disposed underneath the floor of the vehicle body, and are connected to the tail-board at locations well inboard of the sides of the tail-board.

Each of the linkages includes two main levers 12, 13 each of which provides three non-colinear pivots, and the triangles defined by these pivots are identical. The levers are however of somewhat complex shape for reasons which will become clear presently. Levers 12, 13 are spaced apart in a direction lengthwise of the vehicle and are slightly offset laterally from one another to enable them to swing in respective vertical planes. The pivots of the two levers form three pairs 12a and 13a, 12b and 13b, and 12c and 13c respectively and the two pivots of each pair are linked together. Pivots 12a and 13a are linked by one arm of a tilt lever 14, pivots 12b and 13b are linked by a synchronising link 16, and pivots 12c and 13c are linked together by being connected to the tail-board at positions spaced apart lengthwise of the tail-board. The pivot 12a is mounted on a bracket 18 fixed to the chassis 20 of the vehicle and thus provides the only fixed support of the linkage.

The tilting lever 14 has a crank arm 21, and a hydraulic jack 22 is connected between the crank arm and a lug on the bracket 18. A second hydraulic jack 23 is pivotally connected at 25 to a further lug 24 on the bracket 18 and to a pin 26 on the main lever 12, the position of the pin being selected so that it does not come into line with point 25 and pivot 12a in the range of movement of the linkage.

The drawing shows the tail-board in its lowermost position. The tilt lever 14 is prevented from rotating in a clockwise direction by a displaceable stop 28 disposed between the arm 21 and second, fixed, stop 29 carried by the brakcet 18. Extension of the jack 23 causes the tail-board to be raised in a horizontal attitude to the position shown in broken lines substantially level with the floor of the vehicle body. In order now to swing the tail-board into its vertical position, jack 22 is extended and causes the tilting lever 14 to swivel through 90° about the pivot 12a, which in turn causes lever 13 to move bodily in an arcuate path, about the pivots 12a, 12b and 12c, moving pivot 13c into a position vertically above pivot 12c and hence moving the tail-board into its vertical position. Contraction of the jacks in the reverse sequence returns the tail-board first into a horizontal attitude and then in the same attitude to ground level.

It will be seen that the attitude of the tail-board corresponds to that of the arm 14 at all times.

Displacement of the displaceable stop 28 allows the arm 21 to swivel in a clockwise direction until it engages the fixed stop 29, causing the platform to tilt, say 10° into a downwardly inclined position, and permitting the rearward end of the tail-board to rest on a loading dock or other surface.

As will be seen in FIG. 1, the part of lever 13 which extends along the tail-board does not project above the surface of the tail-board anywhere along its length, and the arrangement therefore permits a load to be moved on to the tail-board from either side as well as from the end. By careful design, the resulting elbow portion of the lever 13 can be arranged not to hit the ground during the final stages of lowering the tail-board. Also the levers 12 and 13 are cut away locally so that they clear the rearmost transverse bearer 30 of the floor of the vehicle body as the tail-board is raised to that level.

The tail-board has a ramp 35 hinged to it at its rear edge, the hinge 36 being disposed at the top edges of these components as shown so that the ramp can pivot upward if it strikes an obstruction such as the toes of one of the attendant personnel. The weight of the ramp maintains it in contact with a push-rod 38 which is slidably mounted in a guide recess in one end edge of the tail-board and which is resiliently urged forward by a spring (not shown). At its forward end, the push-rod engages a cam surface formed by a lobe 39 on the outer periphery of the boss on the main lever 13 which boss encircles the pivot 13c. It will be seen that as the link-plates 12 and 13 swing to hoist the tail-board the lobe 39 causes the push-rod to move rearward and swivel the ramp into a raised position, so that it prevents a load which is being pushed from the load platform on to the tail-board from over-running the rear edge of the tail-board. Subsequently, during the tilt movement to bring the tail-board into its vertical position, the lobe and push-rod are restored to the relative positions shown in FIG. 1, so that the ramp forms a vertical extension of the tail-board. The ramp lifting device may, if desired, be rendered inoperative, for example by permitting the ramp to be pushed lengthwise of its hinge connection to disengage the ramp from the push-rod, and a spring 37 may be provided which returns the ramp to its former position when the platform is next lowered to the ground. The ramp therefore performs three useful functions. Firstly it operates as a ramp during loading and unloading; secondly, being in a raised attitude during lifting and lowering of the tail-board, it prevents the load from rolling or sliding off the tail-board; and thirdly, when the tail-board is in a vertical position, the ramp increases the effective height of the tail-board.

It will be clear that the ramp operating mechanism can take many alternative forms. The ramp may for example be raised by a hydraulic jack operated by low pressure fluid. Such jack could be connected in circuit with the main lifting jack 23 so as to raise the ramp before lifting commences. In another alternative arrangement the front end of the push-rod may be linked to a crank arm in the place of lobe 39. In still another alternative arrangement the ramp may be operated by the main hydraulic jack 23 through a lost-motion device, permitting one end of the jack, say pivot 25, to move relative to its carrying member (lug 24) during the first part of the jack movement, and employing this movement to operate the ramp. This arrangement too ensures that the ramp is raised before lifting commences.

The illustrated lift mechanism as applied to a tail-board provides a tail which is relatively thin, facilitating movement of a load onto and off the tail-board, and furthermore enables all the required movements of the tail-board to be motor-driven. Additionally the lift mechanism enables these movements to be carried out without any necessity for altering the part of the standard supporting structure for the floor of the vehicle adjacent the tail-board.

Minor variations in the attitude of the tail-board as it moves up and down can be obtained by introducing slight geometric differences between the positions of the pivots on levers 12 and 13.

Referring now to FIG. 2, the underneath (rearward) face of the tail-board is preferably recessed at its side edges so that a safety gap is left between the tail-board and the ground at these edges when the tail-board is fully lowered. The thickness of the tail-board over the remainder of its area may if desired be such as to enclose the structural members to which the main levers 12 and 13 are connected at 12c and 13c. The "skin" member 41 which defines part of the recess may be of corrugated or grooved form as shown and may be curved upward at its outer side edges wherein it joins the load-bearing surface 42 of the tail-board.

I claim:

1. A lift mechanism for a load-carrying platform comprising at least one parallelogram linkage constituted by two main levers each having three non-colinear pivots and the pivots on the two levers defining substantially identical triangles, and the levers being horizontally offset from each other in a direction towards and away from the platform, one pair of corresponding pivots on the two levers being respectively connected to the platform at two fixed points which are spaced apart a predetermined distance in the direction of the length of the platform, the pivots constituting the second pair being spaced apart by said predetermined distance and interconnected by a synchronising link, and the pivots constituting the third pair being spaced apart by said predetermined distance and interconnected by a tilting lever, one of the pivots of the third pair having a fixed mounting on the vehicle, means for rotating the main levers about their respective pivots constituting the third pair, and means for selectively moving the tilting lever about the fixed mounting into a first position in which the pivots constituting the third pair are disposed one vertically above the other and into a second position in which the said pivots constituting the third pair are substantially in horizontal alignment.

2. A mechanism as claimed in claim 1, wherein at least the main lever nearest the platform is shaped in the region of its pivot of said one pair thereof in such a manner that the parts of the main lever nearest the platform which overlap the platform do not protrude above the load-carrying surface of the platform in any position of the platform within its range of movement.

3. A mechanism as claimed in claim 1, wherein the pivot having the fixed mounting is the pivot of the third pair furthest from the platform when the latter is in a horizontal attitude.

4. A mechanism as claimed in claim 3, comprising a stop operative to support the tilting lever in a first position in which the pivots constituting the third pair are horizontally aligned with each other.

5. A mechanism as claimed in claim 4, wherein the first said stop is removable and a second stop is provided which operates, on removal of the first stop, to permit the platform to rotate the tilt lever about said fixed pivot beyond the first said position towards a second position which is determined by the second stop, and in which the platform is inclined downwardly from its edge nearer said fixed mounting.

6. A mechanism as claimed in claim 4, wherein the main levers are connected to the platform adjacent one widthwise edge of the platform, and the platform has pivotally connected to its opposite widthwise edge a ramp member, and wherein a rod is connected between the ramp member and the linkage in such a manner that movement of the linkage to raise the platform moves the rod in a sense to swivel the ramp upward about its pivot connection to the platform.

7. A mechanism as claimed in claim 6, wherein the rod is mounted for guided sliding movement lengthwise of itself and has its end remote from the ramp in engagement with a cam surface which rotates with the linkage during raising and lowering of the platform.

8. A mechanism as claimed in claim 7, wherein the cam surface is formed on one of said main levers about the pivot connection of such lever to the platform.

9. A mechanism as claimed in claim 1 wherein the effective thickness of the platform is reduced along each of its side edges so as to leave a gap between the platform and a surface on which the platform rests.

* * * * *